United States Patent [19]

Fukushima et al.

[11] Patent Number: 5,082,333
[45] Date of Patent: Jan. 21, 1992

[54] ANTI-SKID CONTROL SYSTEM FOR USE IN MOTOR VEHICLE

[75] Inventors: Akira Fukushima, Kariya; Nobuhiko Makino, Anjo; Kiyoyuki Uchida, Susono; Hideo Inoue, Kanagawa; Kazunori Sakai, Aichi, all of Japan

[73] Assignees: Nippondenso Co., Ltd., Kariya; Toyota Jidosha Kabushiki Kaisha, Toyota, both of Japan

[21] Appl. No.: 526,041

[22] Filed: May 21, 1990

[30] Foreign Application Priority Data

May 23, 1989 [JP] Japan .................. 1-129653

[51] Int. Cl.$^5$ .............................................. B60T 8/66
[52] U.S. Cl. .................................... 303/96; 303/103; 303/109; 188/181 C; 364/426.02
[58] Field of Search ............... 303/96, 95, 97, 98, 303/100, 102, 103, 104, 105, 106, 108, 109, 110, 119, 119 R, 113 R, 119 SV; 364/426.02, 426.03, 426.01; 188/181 C, 181 A, 181 R; 180/197

[56] References Cited

U.S. PATENT DOCUMENTS

| | | | |
|---|---|---|---|
| 3,829,168 | 8/1974 | Schnaibel et al. | 303/105 |
| 4,134,621 | 1/1979 | Smedley et al. | 303/96 |
| 4,168,866 | 9/1979 | McNinch, Jr. et al. | 303/106 |
| 4,896,924 | 1/1990 | Kuwana et al. | 303/103 X |
| 4,970,650 | 11/1990 | Hashiguchi et al. | 303/103 X |

FOREIGN PATENT DOCUMENTS

| | | |
|---|---|---|
| 2520736 | 11/1975 | Fed. Rep. of Germany . |
| 2706132 | 8/1978 | Fed. Rep. of Germany . |
| 3841957 | 6/1990 | Fed. Rep. of Germany . |
| 54-142737 | 11/1979 | Japan . |
| 60-252057 | 12/1985 | Japan . |
| 61-232952 | 10/1986 | Japan . |
| 63-28756 | 2/1988 | Japan . |
| 63-57359 | 3/1988 | Japan . |
| 1-254463 | 10/1989 | Japan . |

Primary Examiner—Douglas C. Butler
Attorney, Agent, or Firm—Cushman, Darby & Cushman

[57] ABSTRACT

An anti-skid control system for use in a motor vehicle having wheels whose rotational speeds are sensed by wheel sensors. The anti-skid control system decides the condition of the road-surface, on which the motor vehicle is running, on the basis of signals from wheel sensors. A reference speed is further calculated on the basis of the sensed speeds of the wheels symmetrically provided at the rear-right and rear-left sides with respect to the advancing direction of the motor vehicle. That is a selected one of an average value of the speeds of the rear-right and rear-left wheels sensed by the wheel sensors and the maximum one of the sensed rear-right and rear-left wheel speeds is selected in accordance with the decided road-surface condition. The reference speed is calculated on the basis of the selected one. A control unit of the anti-skid control system performs slip control of the wheels in accordance with the calculated reference speed. With this arrangement, the anti-skid control system can improve the braking efficiency and controllability irrespective of turning of the motor vehicle.

7 Claims, 7 Drawing Sheets

FIG. 6(a)
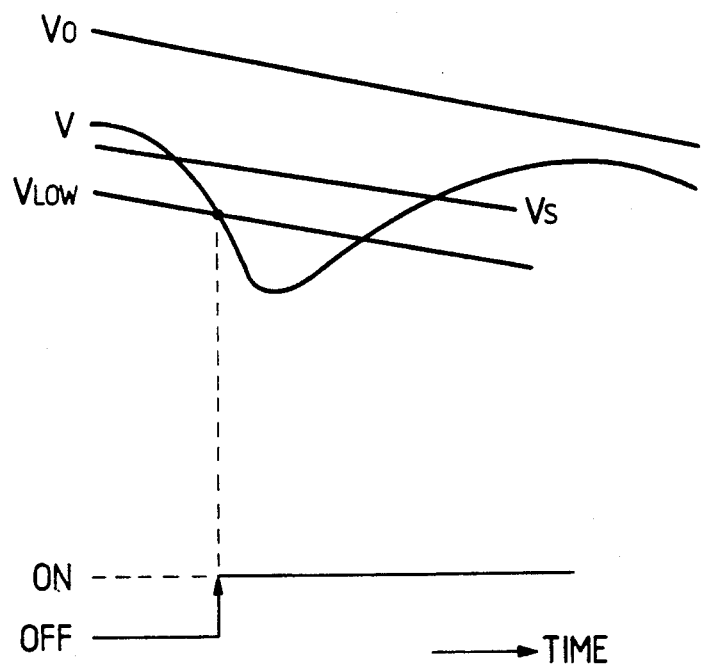
FIG. 6(b)
FIG. 7
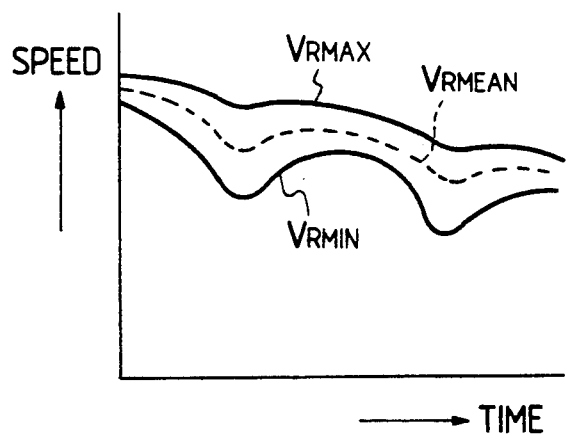

ANTI-SKID CONTROL SYSTEM FOR USE IN MOTOR VEHICLE

BACKGROUND OF THE INVENTION

The present invention relates to an anti-skid control system for use in motor vehicles which prevents locking of each of wheels of the motor vehicle on vehicle braking operation.

Generally, for execution of anti-skid control, anti-skid control systems are arranged to obtain the maximum wheel speed out of the wheels of a motor vehicle so as to calculate an estimated vehicle speed or slip reference value on the basis of the obtained maximum wheel speed. One problem faced in such a braking system relates to deterioration of the braking efficiency on turning of the motor vehicle. That is, during the turning of the motor vehicle, the speed of the outer side rear wheel generally becomes the maximum wheel speed, and therefore the estimated vehicle speed or slip reference value is calculated on the basis of the wheel speed of the outer side rear wheel. As a result, the inner side wheel is controlled in accordance with a value equal to the value to be used for the outer side wheel, whereby the control start timing for the inner side wheel develops a tendency to advance and the control slip ratio becomes smaller. This causes deterioration of the braking efficiency.

SUMMARY OF THE INVENTION

It is therefore an object of the present invention to provide an anti-skid control system which is capable of performing anti-skid control having a high braking efficiency irrespective of vehicle turning and further ensuring a high controllability.

With this and other features which will become apparent as the description proceeds, the anti-skid control system includes road-surface decision means which is responsive to signals from wheel sensor means for sensing a speed of each of the wheels of a motor vehicle. The road-surface decision means is arranged to decide, on the basis of the wheel speeds sensed by the wheel sensor means, that the road surface on which the vehicle is running is in a low friction state. Also included is a reference speed calculation means for obtaining a reference speed on the basis of the sensed speeds of the wheels symmetrically provided at the rear-right and rear-left sides with respect to the advancing direction of the motor vehicle. That is, the reference speed calculation means selects one of an average value of the speeds of the rear-right and rear-left wheels sensed by the wheel sensor means and the maximum one of the sensed rear-right and rear-left wheel speeds in accordance with the decision of the road-surface decision means, and calculates the reference speed on the basis of the selected one. Control means of the anti-skid control system performs slip control of said wheels in accordance with the reference speed obtained by said reference speed calculation means.

More specifically, the reference speed calculation means selects the maximum one of the sensed rear-right and rear-left wheel speeds when the road surface is in the low friction state and selects the average value thereof when the road surface is not in the low friction state and obtains the reference speed to be the greater one of the selected value and the maximum one of the speeds of the front-right and front-left wheels.

BRIEF DESCRIPTION OF THE DRAWINGS

The object and features of the present invention will become more readily apparent from the following detailed description of the preferred embodiments taken in conjunction with the accompanying drawings in which:

FIGS. 6a, 6b, 7, 8 and 9 are graphic diagrams useful for understanding the operation performed by the FIG. 2 electronic control unit.

DETAILED DESCRIPTION OF THE INVENTION

Figure 1:
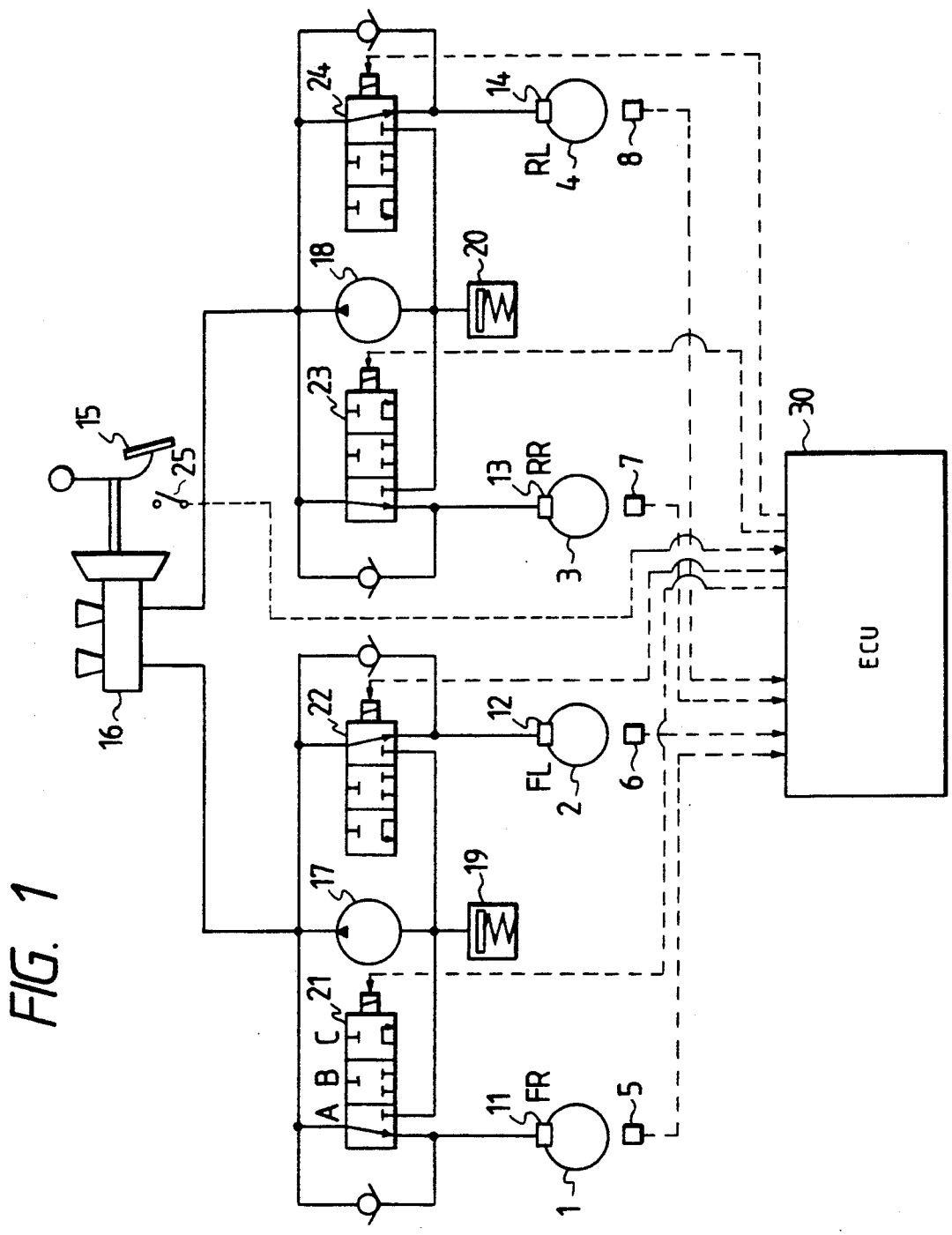
FIG. 1 s an illustration of an anti-skid control system according to an embodiment of the present invention which is incorporated into a braking system of a motor vehicle.

Referring now to FIG. 1, there is schematically illustrated an anti-skid control system according to an embodiment of the present invention which is incorporated in a motor vehicle which has a front right wheel (FR) 1, a front left wheel (FL) 2, a rear right wheel (RR) 3 and a rear left wheel (RL) 4 and in which the front wheels 1 and 2 are for steering operation and the rear wheels 3 and 4 are used as driven wheels. In FIG. 1, designated at numerals 5 to 8 are electromagnetic pickup type or photo-electric converting type wheel speed sensors which are associated with the wheels 1 to 4, respectively, so as to produce wheel speed signals (pulse signal) in accordance with rotations thereof. Further, for the wheels 1 to 4 are provided wheel-braking cylinders 11 to 14 which are coupled through actuators 21 to 24 and hydraulic pressure passages to a master cylinder 16 which is responsive to depressing operation of a braking pedal 15 by the vehicle driver. The operation degree of the braking pedal 15 is detectable by a stop switch 25 which is arranged to generate an ON signal in response to operation of the braking pedal 15 and generate an OFF signal in response to no operation. In response to depressing of the braking pedal 15, the master cylinder 16 generate a hydraulic pressure which is in turn supplied to the wheel-braking cylinders 11 to 14 to brake the respective wheels 1 to 4. Further, provided is motor-driven hydraulic pressure pumps 17 and 18 each of which is arranged to generate a hydraulic pressure to be used for the slip control, the hydraulic pressures generated by the hydraulic pressure pumps 17, 18 being supplied through the actuators 21 to 24 to the respective wheel-braking cylinders 11 to 14. The actuators 21 to 24 are respectively adapted to take pressure control modes so as to adjust the hydraulic braking pressures in the respective wheel-braking cylinders 11 to 14. That is, each of the actuators 21 to 24 is composed of a solenoid-operated three-position valve which selectively takes a pressure-increasing position (A), a pressure-maintaining position (B) or a pressure-decreasing position (C) in accordance with a control signal from an electronic control unit (ECU) 30. In this embodiment, each of the actuators 21 to 24 is arranged to take the pressure-increasing position (A) when deenergized.

The electronic control unit 30 is arranged to be powered in response to turning-on of an ignition switch (26 in FIG. 2) of the motor vehicle so as to be responsive to signals from the wheel speed sensors 5 to 8 and the stop switch 25 to perform calculations for slip control to generate the control signals to the actuators 21 to 24.

Figure 2:
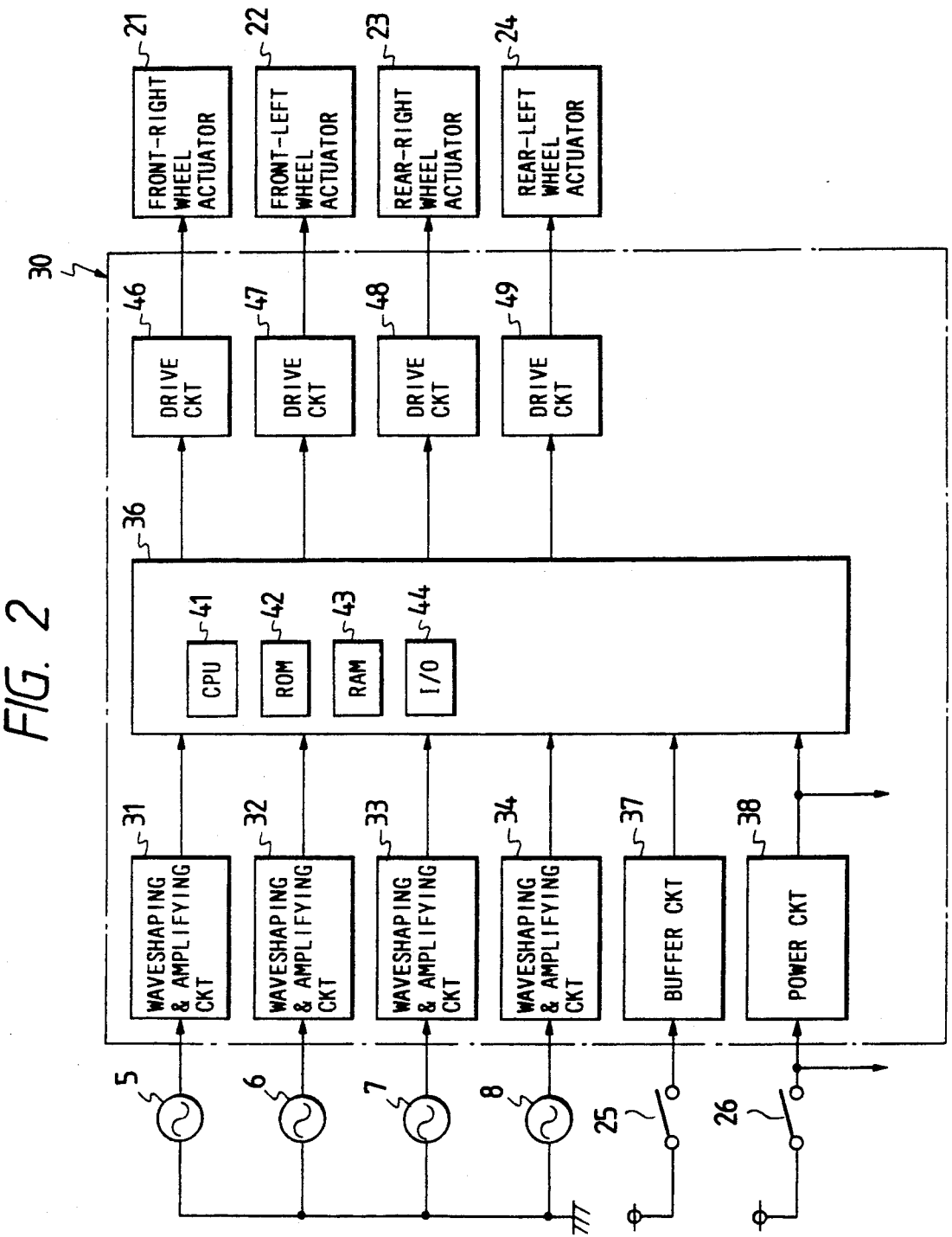
FIG. 2 is a block diagram showing an arrangement of an electronic control unit used in the FIG. 1 anti-skid control system.

FIG. 2 shows the arrangement of the electronic control unit 30. In FIG. 2, the electronic control unit 30 is powered by a power circuit 38 in response to turning-on of the ignition switch 26 of the motor vehicle and constructed as including a microcomputer 36 which comprises a central processing unit (CPU) 41, a read-only memory (ROM) 42, a random access memory (RAM) 43 and an input/output port (I/O) 44. The output signals of the wheel speed sensors 5 to 8 are respectively supplied to waveshaping and amplifying circuits 31 to 34 to be shaped as pulse signals suitable for operation in the microcomputer 36, before being supplied to the microcomputer 36. Further, the microcomputer 36 is responsive to the output signal of the stop switch 25 supplied through a buffer circuit 37 thereto. The microcomputer 36 produces control signals on the basis of the output signals therefrom to supply them to drive circuits 46 to 49 for controlling the actuators 21 to 24. The drive circuits 46 to 49 drive, in accordance with the control signals from the microcomputer 36, electromagnetic solenoids of the actuators 21 to 24, respectively.

Figure 3:
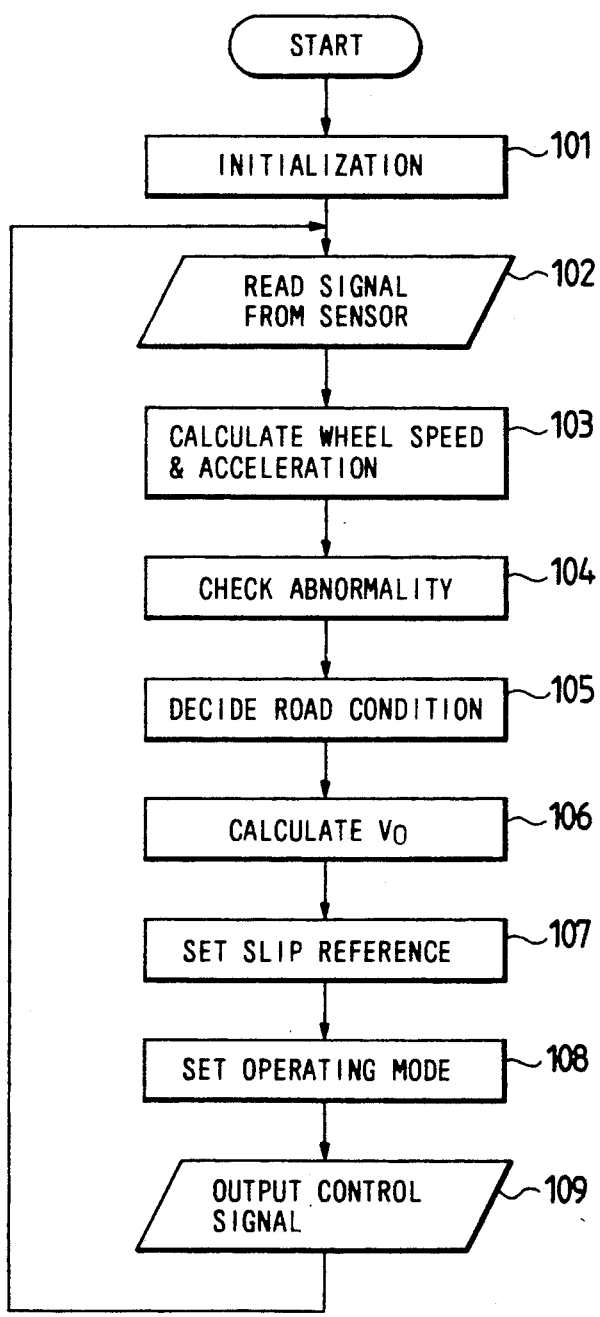
FIGS. 3, 4 and 5 are flow charts showing operation to be performed by the FIG. 2 electronic control unit.

The electronic control unit 30 is energized in response to the turning-on of the ignition switch 26 so that the CPU 41 performs operation in accordance with a program prestored in the ROM 42. The operation will be described hereinbelow with reference to a flow chart of FIG. 3. In FIG. 3, the operation starts with a step 101 to perform the initialization, then followed by a step 102 to read the detection signals of the wheel speed sensors 5 to 8 and the stop switch 25. In a subsequent step 103, wheel speeds and wheel accelerations of the respective wheels 1 to 4 are calculated on the basis of the detections signal read in the previous step 102. After the execution of the step 103, a step 104 is executed to check the abnormality of the detection signals due to sensor failures, noises and others on the basis of the wheel speeds calculated in the step 103 to set or reset a sensor abnormality flag in accordance with the decision result.

The next step 105 is provided for determining the road surface condition. That is, in FIG. 6, the wheel speed V is compared with a low-friction reference value $V_{LOW}$ which is predetermined to be relatively low for decision of a low-friction (low $\mu$) road surface. If the wheel speed V is varied to be lower than the low-friction reference value $V_{LOW}$, a decision is made such that the wheel is running on a road surface whose friction is low. The decision will be referred hereinafter to as low-friction decision. In the response to the low-friction decision, a low-friction decision flag is set from OFF state to ON state. Here, although the low-friction decision is made by the comparison of the wheel speed V with the low-friction reference value $V_{LOW}$, it is also appropriate that the wheel speed V is compared with a predetermined slip reference value Vs so as to measure the time period Td in which the wheel speed V is lower than the slip reference value Vs and the low-friction decision is made when the time period Td is longer than a predetermined time period, or the low-friction decision is made under the condition that the actuator adjusting the braking hydraulic pressure for the corresponding wheel continuously takes the pressure-decreasing mode beyond a predetermined time period. The road surface condition determination is made in accordance with one of the above-described low-friction decisions for each wheel. The cancellation condition of the low-friction decision may follow an anti-skid control termination.

Figure 4:
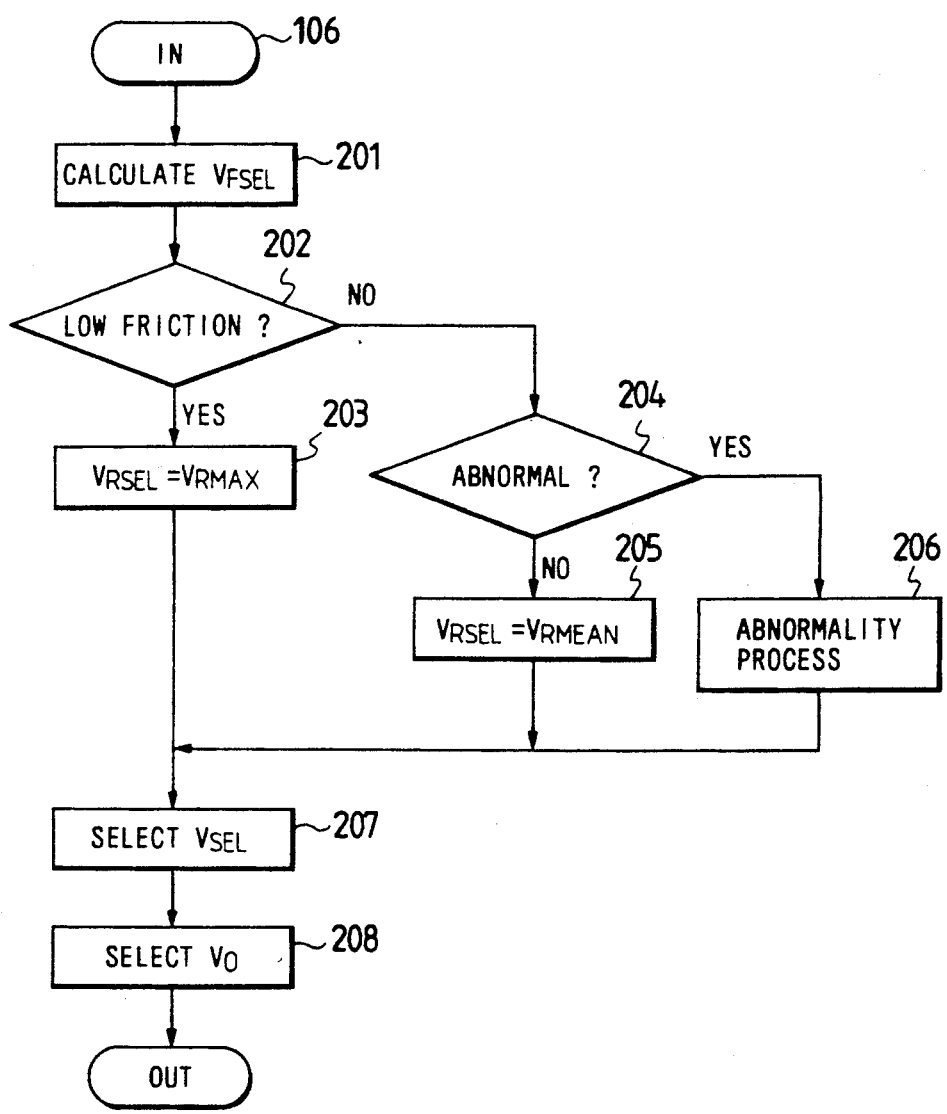

Thereafter, the operational flow advances to a step 106 to calculate an estimation vehicle speed Vo on the basis of the wheel speed. The calculation of the estimation vehicle speed Vo will be described hereinbelow with reference to a flow chart of FIG. 4. In FIG. 4, the calculation begins with a step 201 to obtain a front-reference speed $V_{FSEL}$, which is the maximum one of the wheel speeds of the front-right and front-left wheels (1, 2), in accordance with the following equation.

$$V_{FSEL} = \text{Max}(V_{FR}, V_{FL}) \quad (1)$$

where Max represents an operator for selection of the maximum wheel speed, $V_{FR}$ designates the speed of the front-right wheel and $V_{FL}$ depicts the speed of the front-left wheel.

A step 202 follows to check whether the decision in the step 105 of FIG. 3 indicates a low-friction road surface. If the answer is affirmative, a step 203 is executed to calculate a rear-reference speed $V_{RSEL}$, which is the maximum one of the wheel speeds of the rear-right and rear-left wheels (3, 4), in accordance with the following equation.

$$V_{RSEL} = \text{Max}(V_{RR}, V_{RL}) \quad (2)$$

where Max represents an operator for selection of the maximum wheel speed, $V_{RR}$ designates the speed of the rear-right wheel and $V_{RL}$ depicts the speed of the rear-left wheel.

On the other hand, if the answer in the step 202 is negative, control goes to a step 204 to check the abnormalities of the rear-wheel speed sensors 7 and 8. If normal, control goes to a step 205 so as to determine the rear-reference speed $V_{RSEL}$ to be the average value ($V_{RMEAN}$) of the speeds of the rear-right and rear-left wheels, i.e., in accordance with the following equation.

$$V_{RSEL} = (V_{RR} + V_{RL})/2 \quad (3)$$

On the other hand, if the check result is abnormality, control goes to a step 206 to perform an abnormality process.

That is, assuming that the rear-right wheel (for example) has a smaller-diameter tire (abnormal-size tire), the speed $V_{RR}$ of the rear-right wheel having the smaller-diameter tire becomes higher and hence the rear-reference speed $V_{RSEL}$, which is obtained to be the average value of the rear-right and rear-left wheel speeds, is undesirably heightened as compared with use of the standard-tire mounting wheels. Thus, in this case, the rear-reference speed $V_{RSEL}$ is not determined to be the average value of the rear-right and rear-left wheel speeds, but is set to be the speed $V_{RL}$ or the rear-left wheel for which the abnormality flag is not set.

Further, in the case of occurrence of wire disconnection in the wheel speed sensor for the rear-right wheel, the speed $V_{RR}$ of the rear-right wheel becomes zero and the average value of the speeds of the rear-right and rear-left wheels becomes lower as compared with the appropriate value. Thus, the rear-reference speed $V_{RSEL}$ is set to be the speed $V_{RL}$ the rear-left wheel. Similarly, in the case of generation of noises in the wheel speed sensor for one wheel, the speed of the other wheel for which the abnormality flag is not set is determined as the rear-reference speed $V_{RSEL}$.

As described above, when the sensor abnormality or tire-size abnormality takes place, the rear-reference speed $V_{RSEL}$ is set to be the speed of the wheel for which the abnormality flag is not set, instead of the average value of the rear-right and rear-left wheel speeds $V_{RR}$ and $V_{RL}$.

Returning to FIG. 4, after the above-described execution of the step 203, 205 or 206, a step 207 is executed to determine a reference speed $V_{SEL}$ to be the maximum one of the front-reference speed $V_{FSEL}$ and the rear-reference speed $V_{RSEL}$ in accordance with the following equation.

$$V_{SEL} = \text{Max}(V_{FSEL}, V_{RSEL}) \tag{4}$$

In a subsequent step 208, an estimation vehicle speed Vo(n) is obtained on the basis of the previously obtained estimation vehicle speed in accordance with the following equation.

$$Vo(n) = \text{Med}(V_{SEL}, Vo(n-1) + K1 \cdot t, Vo(n-1) - K2 \cdot t) \tag{5}$$

where Med designates an operator for selecting a medium value, Vo(n−1) depicts the estimation vehicle speed calculated previously, K1 and K2 are predetermined acceleration (or deceleration), i.e., the upper and lower limits of the vehicle acceleration (or deceleration) which can be taken when the vehicle is running (for example, K1 = 0.5G, K2 = 1.0G), and t depicts a time period from the previous calculation to the current calculation.

Returning again to the flow chart of FIG. 3, after the above-described execution of the step 106, control advances to a step 107 to set a slip reference value Vs for determining the operating modes of the actuators 21 to 24 which respectively adjust the braking hydraulic pressures applied to the wheels 1 to 4. The reference value Vs is obtained by providing a predetermined offset amount KV to the obtained estimation vehicle speed Vo(n), i.e., in accordance with the following equation.

$$Vs = K3 \cdot Vo(n) - KV \tag{6}$$

where K3 denotes a predetermined constant value.

Figure 5:
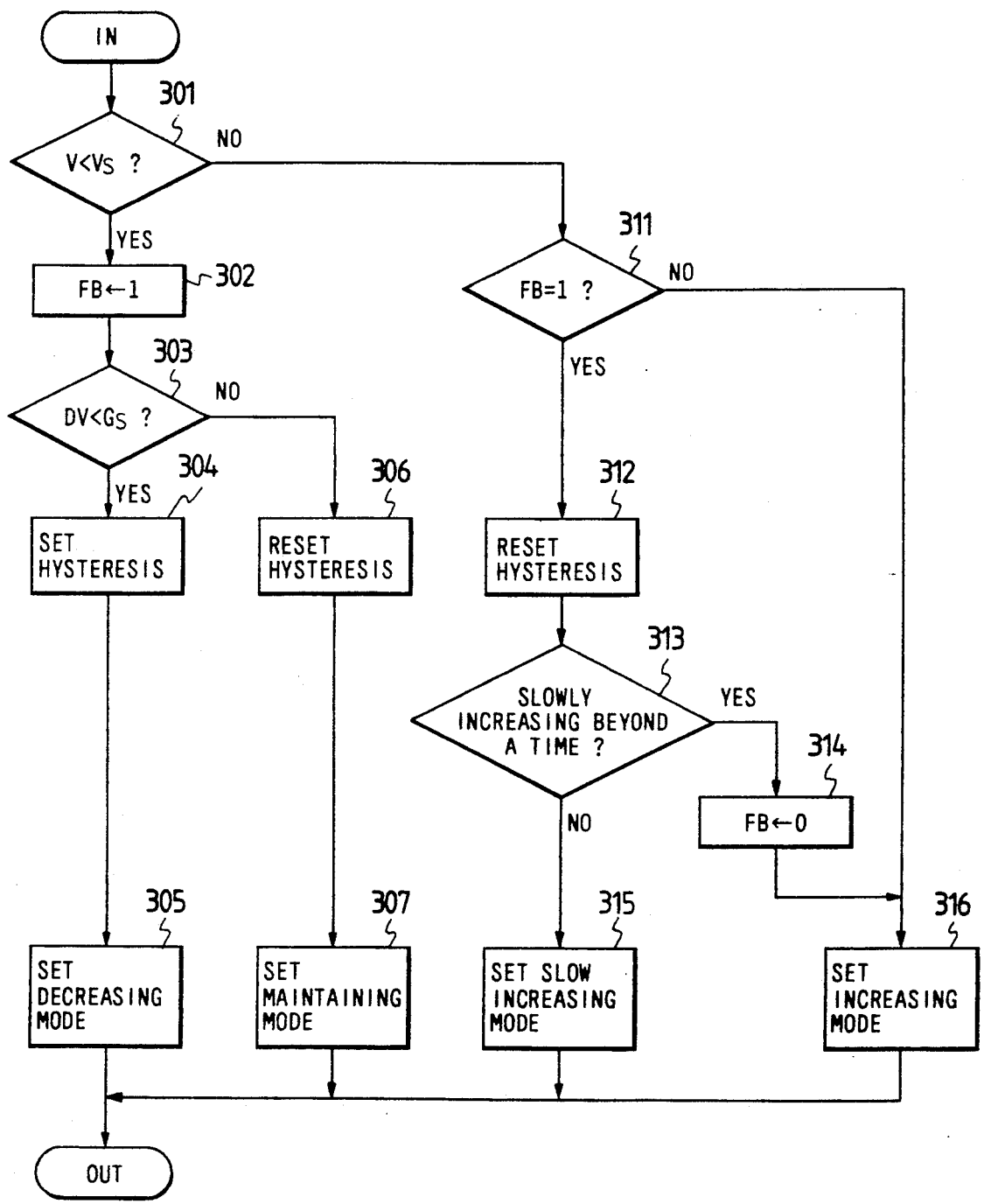

The step 107 is followed by a step 108 which will be described hereinbelow with reference to a flow chart of FIG. 5. In FIG. 5, a step 301 is first executed in order to check whether at least one of the speeds V of the respective wheels is smaller than the slip reference value Vs which is obtained on the basis of the estimation vehicle speed Vo. If the wheel speed V is smaller than the reference value Vs, control goes to a step 302 to set a control flag FB, which shows that the motor vehicle is under the anti-skid control, from "0" to "1". A step 303 follows to check whether the acceleration values DV of the respective wheels are smaller than a predetermined acceleration reference value Gs. If the answer in the step 303 is affirmative, a hysteresis P is set to the acceleration reference value Gs (i.e., Gs=Gs+P) in a step 304 and the setting of the pressure-decreasing mode is made in a step 305.

On the other hand, if the decision in the step 303 is made such that the wheel acceleration DV is not smaller than the reference acceleration Gs, a step 306 is executed to reset the hysteresis P, then followed by a step 307 to perform the setting of the pressure-maintaining mode.

Returning to the step 301, if the speeds of the wheel is not lower than the reference value Vs, control goes to a step 311 to check whether the control flag FB is set to "1" which shows that the vehicle is under the anti-skid control. If so, a step 312 is executed to reset the hysteresis P, then followed by a step 313 to check whether the slowly pressure-increasing mode is continuously made beyond a predetermined time period. If the decision in the step 313 is negative, the slowly pressure-increasing mode is set in a step 315. The slowly pressure-increasing mode comprises n pressure-increasing patterns each of which performs pressure-increasing by a slight time and performs pressure-maintaining for a predetermined time after elapse of the pressure-increasing time.

On the other hand, if the answer in the step 311 is negative, control goes to a step 316 for setting of the pressure-increasing mode. Further, if the answer in the step 313 is affirmative, control goes to a step 314 to reset the control flag FB to "0", then followed by the aforementioned step 316.

Returning to the flow chart of FIG. 3, after the execution of the step 108, a step 109 is then executed where a control-valve switching signal corresponding to the pressure control mode determined in the above-described steps is supplied through the drive circuit 46, 47, 48 or 49 to the actuator 21, 22, 23 or 24 for braking of the corresponding wheel.

In the above operation, for determining the reference speed $V_{SEL}$, the step 207 is arranged so as to select the front-reference speed $V_{FSEL}$ as the reference speed $V_{SEL}$ under a specific condition and to normally select the rear-reference speed $V_{RSEL}$ as the reference speed $V_{SEL}$ because the braking force for the front wheel is greater as compared with the rear wheel and hence the rotational speed of the rear wheel is higher than that of the front wheel. This arrangement can obtain the following results.

(1) In the case of running on a low-friction road surface, when the rear-right and rear-left wheels are respectively rotated at speeds $V_{RMAX}$ and $V_{RMIN}$ as illustrated in FIG. 7, the speed $V_{RMAX}$ which is the maximum one of the rear-right and rear-left wheel speeds is calculated as the rear-ference speed $V_{RSEL}$ so as to calculate the estimation vehicle speed Vo(n), thereby causing the error (dropping amount) of the estimation vehicle speed from the real vehicle speed to be suppressed to a minimum value when the vehicle is running on the low-friction road surface. Accordingly, it is possible to reduce the difference (dropping amount) between the reference value Vs and an appropriate value which difference tends to occur in the prior art technique, thereby preventing the wheel from being controlled with a great slip ratio so as to improve the directional stability and controllability of the vehicle on a low-friction road surface.

(2) In the case of a case different from the above-mentioned case (1), if no abnormality, the medium value $V_{RMEAN}$ (indicated by a dotted line in FIG. 7) of the rear-right and rear-left wheel speeds $V_{RMAX}$ and $V_{RMIN}$ is determined as the rear-reference speed $V_{RSEL}$ to calculate the estimation vehicle speed Vo(n). With this arrangement, when the vehicle is turning, an estimation vehicle speed can be obtained appropriately so as to be proportional to the difference between the right and left wheel speeds. In this case, the estimation vehicle speed becomes lower as compared with an estimation vehicle speed which is obtained on the basis of the speed of the outer side wheel in the prior art technique.

Thus, according to the present invention, it is possible to prevent the timing of start of the anti-skid control for the inner side wheel from being advanced, thereby improving the braking efficiency.

Here, for obtaining the estimation vehicle speed Vo(n), although the average value of the rear-right and rear-left wheel speeds is merely used in the case that the low-friction decisions are not made for both the front-right and front-left wheels, it is also appropriate to use an average value $V_{RMEAN2}$ with a predetermined limit $L_{LIM}$ as expressed by the following equation.

$$V_{RMEAN2} = \text{Max}\,((V_{RR}+V_{RL})/2,\,\text{Max}\,(V_{RR},\,V_{RL}) - L_{LIM}) \quad (7)$$

Figure 8:
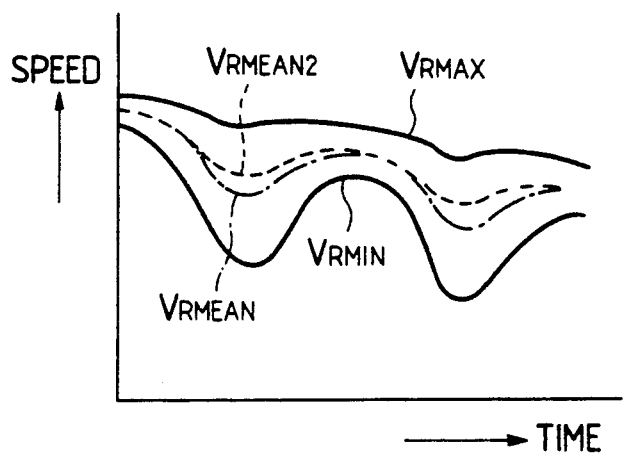

The simple average value $V_{RMEAN}$ varies as indicated by an alternate long and short dash line in FIG. 8, whereas the average value $V_{RMEAN2}$ varies as indicated by a dotted line in the same figure. This allows preventing the average value from being decreased undesirably due to lowering of the speed of the inner side wheel caused by decrease in the load for the inner side wheel when the vehicle is turning and further due to lowering of the speed of the low-friction side wheel when the vehicle is running on a split road.

That is, although using the average value is for estimating the vehicle speed at the intermediate position between the rear-right and rear-left wheels, its error tends to become great under the above-mentioned conditions. Thus, if considering the difference $\Delta V$ between the speeds of the right and left wheels on turning on the basis of the motional characteristic and geometric relation of the motor vehicle (here, the slip ratios of the right and left wheels are considered as being zero) and assuming that the lateral slipping angle of the center of gravity of the vehicle can be disregarded, the following two equations are satisfied in terms of the turning radius r.

$$1/r = \Delta V/w \cdot V_B) \quad (8)$$

$$1/r = \alpha/V_B^2 \quad (9)$$

where w represents the tread, $V_B$ designates the vehicle speed and $\alpha$ depicts the lateral acceleration.

From the equations (8) and (9), $\Delta V$ can be expressed by the following equation.

$$\Delta V = w \cdot \alpha/V_B \quad (10)$$

In the equation (10), if a predetermined value $\alpha o$ is substituted into $\alpha$, a vehicle factor wo is substituted into w and the value obtained by dividing $\alpha V$ by two is $V_{LIM}$, $V_{LIM}$ is obtained as follows.

$$V_{LIM} = wo \cdot \alpha o/(2 \cdot V_B) \quad (11)$$

Figure 9:
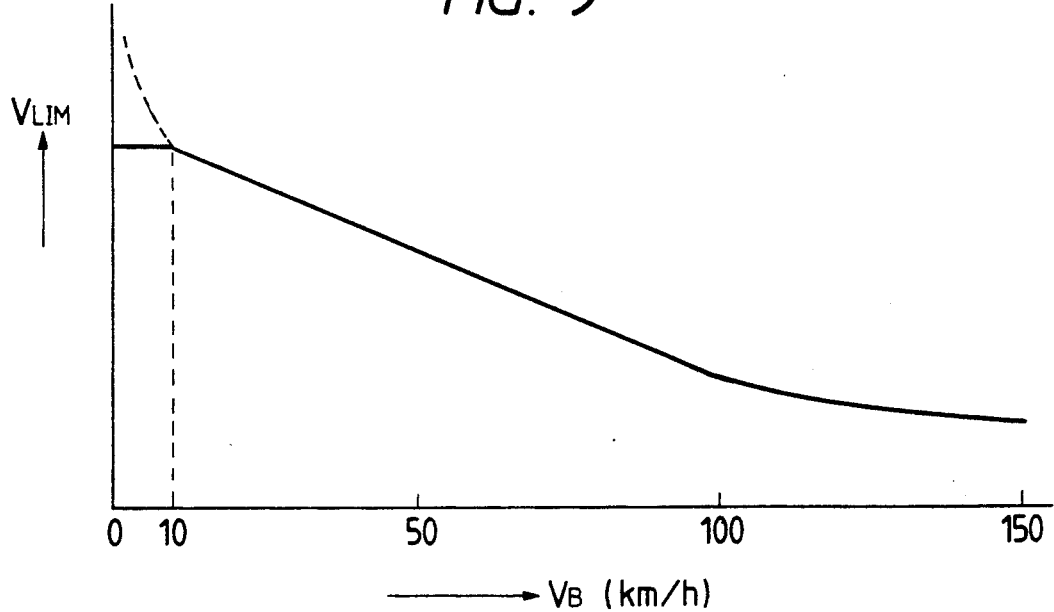

The relation between $V_{LIM}$ and $V_B$ becomes as illustrated in FIG. 9. In FIG. 9, $V_{LIM}$ is constant in the case of $V_B \leq 10$km/h. This is because $V_{LIM}$ becomes a considerably great value when $V_B$ is 10 km/h and the case that $V_{LIM}$ assume a greater value when the vehicle speed is below 10km/h is very few. Thus, the subtraction of $V_{LIM}$ from the maximum one of the rear-right and rear-left wheel speeds shows an estimation vehicle speed at the intermediate position of the rear-right and rear-left wheels under the vehicle-running state (which is estimated to be V, $\alpha o$), thereby reducing the affection of the wheel slip ratio.

The value $\alpha o$ is set to be relatively great to be substantially equal to a value for a high-friction road surface such as a dry asphalt road surface. The electronic control unit 30 calculates $V_{LIM}$ in accordance with the above equations or a map corresponding to FIG. 9 to obtain the limited average value which is in turn used as the rear-reference speed. This allows obtaining a desirable estimation vehicle speed and slip reference value in a wide vehicle-running region so as to improve both the braking efficiency and control stability.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An anti-skid control system for use in a vehicle, comprising:
   wheel sensor means for sensing wheel speeds of each wheel of said vehicle;
   road-surface determining means for determining a condition of a road surface on which said vehicle is running based on the sensed wheel speeds;
   reference speed selecting means for selecting a reference speed in accordance with a sensed rear-right wheel speed and rear-left wheel speed, said reference speed selecting means determining a mean value speed of said rear-right and rear-left wheel speeds and a maximum speed between said rear-right and rear-left wheel speeds, said reference speed being selected as one of said means value speed and said maximum speed based on said determined road surface condition; and
   control means for performing slip control of said wheels based on said reference speed.

2. A system as claimed in claim 1, wherein said road-surface condition is a road surface in a low friction state; and
   said reference speed selecting means selects said maximum speed when the road surface is determined to be in said low friction state, and selects the mean value speed when said road surface is not in the low friction state.

3. A system as claimed in claim 2, wherein said road-surface determining means compares a sensed wheel speed with a reference value, and when the last-mentioned sensed wheel speed is lower than said reference value said road surface is determined to be in said low friction state.

4. An anti-skid control system as claimed in claim 1, wherein said control means comprises estimation vehicle speed calculation means for estimating a vehicle speed based on the selected reference speed and performing slip control of said wheel based on the estimation vehicle speed and the sensed wheel speeds.

5. An anti-skid control system as claimed in claim 4, wherein said control means independently performs the slip control of each wheel in accordance with a comparison between said estimation vehicle speed and the sensed wheel speed of each wheel.

6. An anti-skid control system for use in a vehicle, comprising:
   wheel sensor means for sensing right wheel speeds and left wheel speeds of said vehicle;

average-value calculation means for calculating an average value speed between said right and left wheel speeds;

estimation vehicle speed calculation means for calculating an estimation speed of said vehicle based on said average value speed;

control means for performing slip control in accordance with the sensed wheel speeds and said estimation speed;

low-friction determination means for determining that a road surface on which said vehicle is running is in a low-frictions state based on the sensed wheel speeds; and switching means for switching said estimation vehicle speed calculation means from calculating the estimation vehicle speed based on said average value speed to a maximum one of said right wheel speeds and left wheel speeds when the road surface is determined to be in the low-friction state.

7. An anti-skid control system for use in a vehicle, comprising:

wheel sensor means for sensing wheel speeds of each wheel of said vehicle;

wheel speed processing means for calculating wheel speed factors including:

average value factor means for calculating an average value between a rear-right wheel speed and rear-left wheel speed, first factor selection means for selecting a first factor equal to a maximum of said rear-right wheel speed and rear-left wheel speed, and second factor selection means for selecting a second factor equal to a maximum of a front-right wheel speed and front-left wheel speed;

road condition determining means for determining, based on said sensed wheel speeds, whether a road surface on which said vehicle is running is in a low friction state or a high friction state;

estimation vehicle speed selecting means for selecting an estimation speed, said estimation speed being selected as the greater one of the average value, and the first factor when a high friction state road surface is determined, and selected as the greater one of said first factor and said second factor when a low friction state road surface is determined; and control means for performing slip control in accordance with the selected estimation speed.

* * * * *